United States Patent [19]
Marks et al.

[11] Patent Number: 5,894,586
[45] Date of Patent: Apr. 13, 1999

[54] SYSTEM FOR PROVIDING ACCESS TO MEMORY IN WHICH A SECOND PROCESSING UNIT IS ALLOWED TO ACCESS MEMORY DURING A TIME SLOT ASSIGNED TO A FIRST PROCESSING UNIT

[75] Inventors: Karl M. Marks, Medford, Mass.; Geoffrey A. Dreher, Nashua, N.H.; Frank P. Monaco, Burlington; Craig C. Cook, Wayland, both of Mass.

[73] Assignee: Xionics Document Technologies, Inc., Burlington, Mass.

[21] Appl. No.: 08/786,989

[22] Filed: Jan. 23, 1997

[51] Int. Cl.$^6$ .................................................... G06F 12/00
[52] U.S. Cl. .................................... 395/848; 395/842
[58] Field of Search ........................ 348/468; 395/873, 395/844, 200.8, 392, 848, 842; 370/537

[56] References Cited

U.S. PATENT DOCUMENTS

| | | | |
|---|---|---|---|
| 3,988,545 | 10/1976 | Kuemmerle et al. | 370/537 |
| 4,595,951 | 6/1986 | Filliman | 348/468 |
| 5,182,800 | 1/1993 | Farrell et al. | 395/844 |
| 5,206,933 | 4/1993 | Farrell et al. | 395/200.8 |
| 5,287,195 | 2/1994 | Blumer | 358/298 |
| 5,408,658 | 4/1995 | Rechtschaffen et al. | 395/392 |
| 5,430,676 | 7/1995 | Ware et al. | 365/189.02 |
| 5,446,696 | 8/1995 | Ware et al. | 365/222 |
| 5,499,385 | 3/1996 | Farmwald et al. | 395/823 |
| 5,511,024 | 4/1996 | Ware et al. | 365/189.04 |
| 5,513,327 | 4/1996 | Farmwald et al. | 395/309 |

OTHER PUBLICATIONS

Toprani, Subodh. "Ramnbus and Uma: The Win/Lose Debate", Rambus, Inc., Cataldo, Anthony "DRAM Makers Battle Rambus—But Intel Backs RDRAM Interface", Electronic Buyer's Guide, Issue: 1037, Dec. 16, 1996.

Primary Examiner—Thomas C. Lee
Assistant Examiner—David Ton
Attorney, Agent, or Firm—Mintz, Levin, Cohn, Ferris, Glovsky and Popeo, P.C.

[57] ABSTRACT

Embodiments of the present invention are directed to a microcontroller system incorporating a DMA system and to a method of accessing a memory by a plurality of processing units. In embodiments of the present invention, the microcontroller system includes a plurality of processing units, a DMA module, and an interface to an external memory system. The DMA module controls access to the external memory system by the processing units on a time shared basis by allocating time slots to each of the plurality of processing units. The processing units can access the external memory system during their assigned time slots. Data transfers to and from the memory are accomplished in packets having a fixed maximum size.

23 Claims, 5 Drawing Sheets

| SLOT | 0 | 1 | 2 | 3 | 4 | 5 | 6 | 7 | 8 | 9 | 10 | 11 |
|---|---|---|---|---|---|---|---|---|---|---|---|---|
| CHANNEL | SCAN | JBIG | MEMORY | SCAN AND FAX | PRINT AND HOST | MEMORY | SCAN | JBIG | MEMORY | FAX AND SCAN | HOST AND PRINT | MEMORY |

SYSTEM FOR PROVIDING ACCESS TO MEMORY IN WHICH A SECOND PROCESSING UNIT IS ALLOWED TO ACCESS MEMORY DURING A TIME SLOT ASSIGNED TO A FIRST PROCESSING UNIT

FIELD OF THE INVENTION

The present invention relates primarily to a method and apparatus for providing multiple channel direct memory access, and more specifically to a method and apparatus for providing high speed access to a common memory by a number of distinct processing units.

DISCUSSION OF THE RELATED ART

The use of Direct Memory Access (DMA) within computer systems to provide rapid transfer (read or write) of data between a processing device, whether it be a peripheral device or a functional processing block, and a memory is well known. In a typical system, direct memory access provides for direct communication between a peripheral and a memory without intervention by a program being executed on the central processing unit (CPU) of the computer system.

Figure 1:
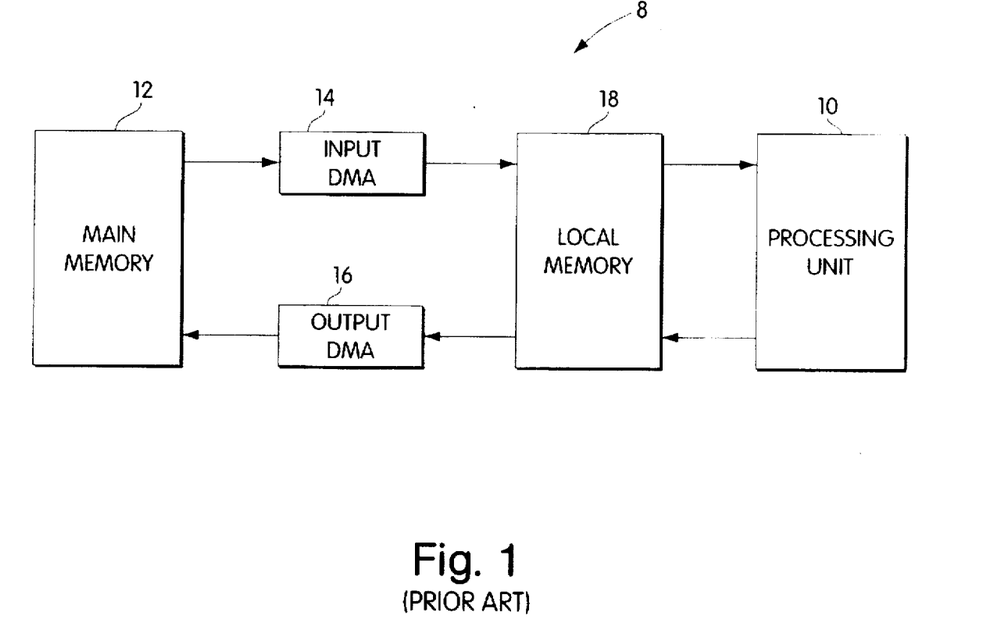
FIG. 1 shows a functional block diagram of data transfer between a processing unit and a main memory in accordance with a prior art DMA scheme.

FIG. 1 shows a functional data flow block diagram of a typical implementation of a system 8 having direct memory access, in which a processing unit 10 accesses a main memory 12 using direct memory access. In the system shown in FIG. 1, when it is desired to perform a process within the processing unit 10 using data stored in the main memory 12, a request is made by the processing unit to the CPU to set up an input DMA unit 14 for the required data stored in the main memory. The data is subsequently transferred from the main memory to a local memory 18 which is directly accessible by the processing unit 10. Once the data is transferred to the local memory, the processing unit 10, can perform the desired process on the local data.

The processing unit 10 reads input data from the local memory, performs a process on the data to create output data, and writes the output data to the local memory 18. After the output data is written to the local memory 10, an output DMA process transfers the output data from the local memory 18 to the main memory 12.

The use of direct memory access has several advantages, not the least of which is it allows data to be transferred rapidly from main memory to a peripheral device or processing unit without direct control by the CPU, thus enabling the CPU to simultaneously perform other processes. There are, however, several drawbacks associated with the DMA scheme described above. These drawbacks include the relatively high cost of the local memory, the impact on system overhead of dealing with a non-uniform memory model, bandwidth limitations of the local memory, and difficulty associated with simultaneously reading input data from memory, writing output data to memory and processing the input data to generate the output data. Each of these drawbacks are described in greater detail below.

In the DMA scheme described above, the processing unit has a dedicated local memory 18 having a fixed size. The size of the local memory limits the size of data structures that can be processed at a given time by the processing unit 10. In graphics processing, wherein it may be desirable to process large quantities of data to provide, for example, a rotation or scaling of an image, the processing limits imposed by the size of the local memory 18 place constraints on system performance. For example, in a graphical system in which the processing unit 10 is required to process an image having a known size and a known resolution, for example 300 dpi (dots per inch), the local memory can be sized accordingly. However, if it is desired to occasionally process images having a greater resolution, for example 600 dpi, then the memory size must be quadrupled, and the cost of the local memory, as well as the area required for the local memory, increase significantly. If the local memory is sized based on a system requirement of 300 dpi resolution, then a typical system will not be able to process images having 600 dpi resolution. However, if the local memory is sized for the 600 dpi resolution and the system is used primarily for images having 300 dpi, then there is a significant increase in cost and area to provide what might be a seldom used feature. Further, if the local memory becomes too large, then it may be necessary to locate the local memory on a separate chip from the processing unit 10 for cost reasons and which in addition reduces performance.

In the prior art DMA system described above with reference to FIG. 1, there are two copies of a set of data (input data and output data) at certain points in time, one in the local memory 18 and the other in the system memory 12. The system is thus required to synchronize the completeness and the validity of these copies with respect to time.

In the prior art DMA system shown in FIG. 1, the bandwidth (or throughput) of the local memory 18 constrains the overall system performance. In order to process a set of data in the main memory 12 by the processing unit 10 and store the processed data in the main memory, there are four read/write operations that must be performed by the local memory 18; 1) data read from the main memory 12 is written in the local memory; 2) the processing unit 10 reads the data from the local memory; 3) processed data from the processing unit is written to the local memory; 4) the processed data is read from the local memory and transferred to the main memory. If the local memory cannot provide the transfers rapidly enough, then the local memory becomes a significant bottleneck to the transfer of data, thereby limiting system performance. The limitations associated with the local memory 18 become more significant if the local memory is shared by a number of processing units.

As discussed above, another drawback of the prior art DMA scheme shown in FIG. 1 is that the input of data to the local memory, the processing of data in the processing unit and the output of data from the output DMA are three discrete processes that are typically performed sequentially and not simultaneously. Systems providing some overlap of these functions are known, however, they typically require system intervention by the CPU to maintain synchronization, and in any event, the synchronization is typically complex.

In the functional block diagram shown in FIG. 1, the connection between the DMA and the main memory is shown as a direct connection to simplify the discussion. In typical systems, the DMA data transfer to and from main memory occurs over a system bus that is shared with the CPU. The CPU also uses the system bus to access the main memory 12. Further, in the functional block diagram shown in FIG. 1, one processing unit 10 is shown coupled through the input and output DMA to the main memory 12. Some prior art systems use multiple channel DMA schemes to provide access for a number of processing units to a main memory. In these prior art systems, only one channel can access the main memory at a given time, and access to the main memory by the channels is typically allocated on a first-come, first served basis. Channels may be assigned priority, whereby, when two channels are waiting for access to the main memory, the channel with higher priority will be granted access first.

As the number of DMA channels is increased, the memory bandwidth (or throughput) available to a given channel is decreased, and one drawback of these prior art systems is that the memory bandwidth of a given channel is dependent on the number of access requests made by the other channels and on the amount of data to be transferred as a result of the request. Thus, the memory bandwidth available for each channel is highly variable, and the latency period between the time a request for access is made and the time that the request is granted is also variable, requiring the processing unit to wait an unknown period of time before a desired process can be performed.

SUMMARY OF THE INVENTION

Embodiments of the present invention overcome drawbacks of prior art DMA schemes by providing a multiple channel DMA apparatus and method with improved memory access.

One embodiment of the present invention is directed to a microcontroller system for accessing a memory. The microcontroller system includes a plurality of processing units and an interface access module that interfaces with the memory and the plurality of processing units to control access by the processing units to the memory. The interface access module includes a controller that controls access to at least one memory by the processing units on a time-shared basis according to a parameterized allocation scheme.

Another embodiment of the present invention is directed to a method for providing access to a memory by a plurality of processing units. The method includes steps of establishing an order of access to the memory by the plurality of processing units by assigning each of the plurality of processing units a time slot in a device access cycle to enable the plurality of processing units to access the memory on a time-shared basis, detecting a request for access to the memory by one of the plurality of processing units, and allowing the one of the plurality of processing units to access the memory to transfer data during its assigned time slot.

Another embodiment of the present invention is directed to a microcontroller system for accessing a memory. The microcontroller system includes a plurality of processing units, and means for controlling data transfers between the memory and the plurality of processing units and for controlling access by the processing units to the memory on a time-shared basis according to a parameterized allocation scheme.

BRIEF DESCRIPTION OF THE DRAWINGS

For a better understanding of the present invention, reference is made to the drawings which are incorporated herein by reference and in which.

DETAILED DESCRIPTION

For purposes of illustration only, and not to limit generality, the present invention will now be explained with reference primarily to a DMA access scheme utilized in a graphical imaging processing system. One skilled in the art will appreciate, however, that embodiments of the present invention, although desirable for use in graphical imaging processing systems, are not limited to such systems, but rather, are applicable to other systems using multiple channel DMA to simultaneously perform a number of processing functions, especially in applications like multimedia and communications.

As described below in greater detail, embodiments of the present invention provide a DMA system in which a minimum effective memory bandwidth for each of the processing units can be preset and maintained, and in which a number of processing units can operate in parallel without the need for large local memories for the processing units. Embodiments of the invention accomplish this by using a combination of input and output packet buffers for each of the processing units, packet transfers between the processing units and the main memory, and memory access time slot assignments for each of the processing units.

Figure 2:
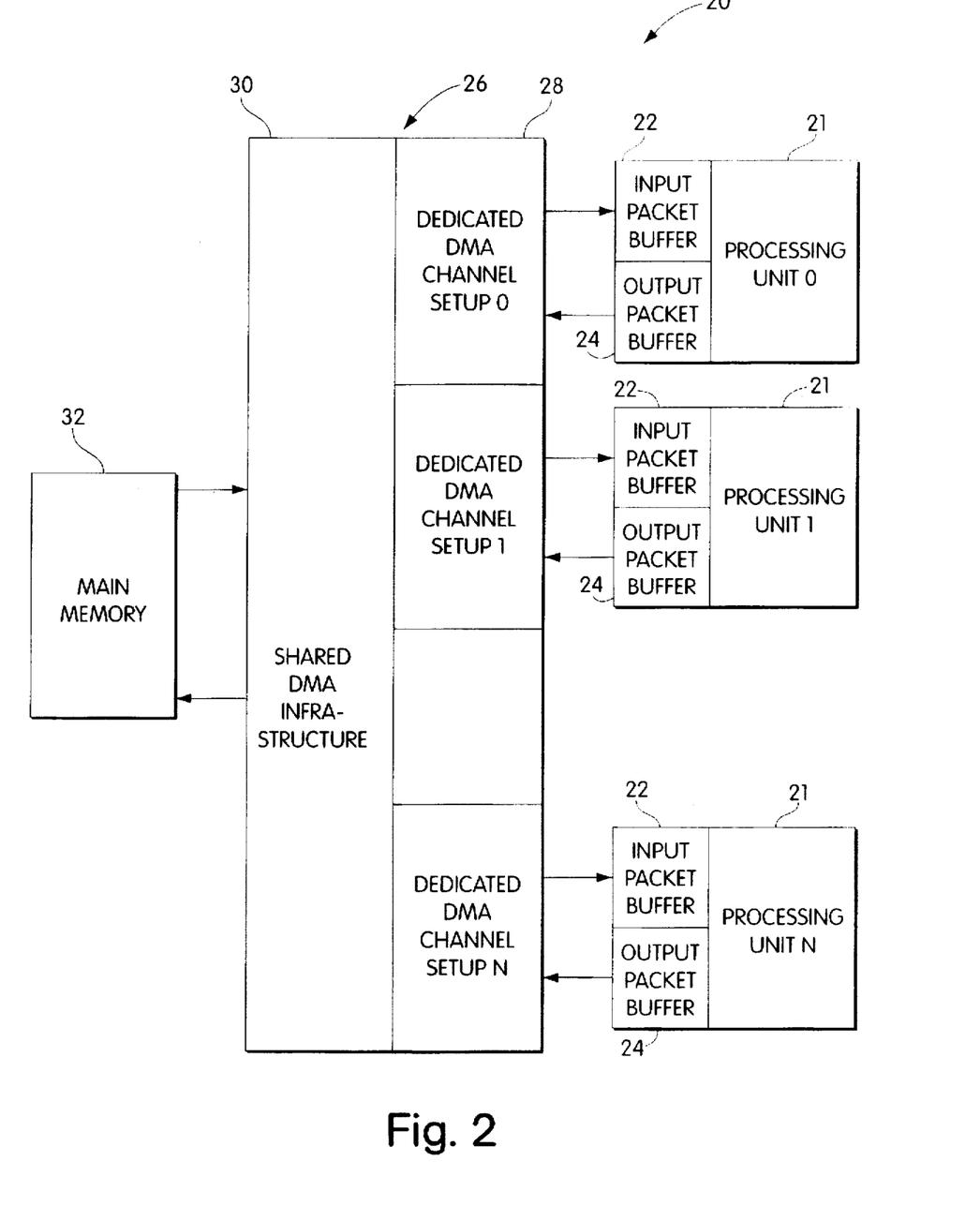
FIG. 2 shows a functional block diagram of data transfer between processing units and a main memory in accordance with one embodiment of the present invention.

A DMA system in accordance with one embodiment of the invention will first be described generally with reference to FIG. 2 and will subsequently be described in greater detail with reference to FIGS. 4 and 5. FIG. 2 shows a functional block diagram of a DMA system 20 and the data transfer paths between components of the system. The DMA system 20 includes a number of processing units 21 a main memory 32 and a DMA module 26. In the diagram of FIG. 2, a number, n, of processing units 21 are coupled to the DMA module. Each of the processing units 21 is coupled to a dedicated DMA channel 28 of the DMA module 26. The DMA module 26 includes shared DMA structure 30 which provides for address generation and dispatch to the main memory. Each of the processing units 21 can operate simultaneously, and independently from the other processing units, however, it has to compete with the other processing units for access to the main memory 32 through its dedicated channel and through the shared DMA structure 26.

Depending on its individual needs, each of the processing units 21 has access to input packet buffers 22 and/or output packet buffers 24. The input and output packet buffers 22 and 24 are relatively small buffers that in one embodiment are implemented using simple first-in, first out (FIFO) buffers. The actual size of the buffers is determined based on a worst case latency of the system, wherein the latency is defined as the time between when a request for access to the main memory is made and the time that data is transferred to the input or from the output buffer. Data to be processed by a processing unit 21 is received in its input buffer 22 from the main memory, the data is then processed in the processing unit to create output data which is temporarily stored in the output buffer. The output data in the output buffer is subsequently transferred from the output buffer to the main memory. Data is transferred from and to the main memory in the form of packets having a fixed packet size which defines the maximum amount of data that is transferred in one packet transfer. In one embodiment of the present invention, the input buffer and the output buffer is larger than the fixed packet size allowing more than one packet of data to be temporarily stored in both the input buffer and the output buffer to avoid input buffer underruns and output buffer overruns, that would stall the processing.

Once one packet of data has been transferred from the main memory to the input buffer, the processing unit can operate continuously to process data in a pipeline fashion receiving input data from the input buffer and providing output data to the output buffer. While the processing unit is processing data, the input buffer continues to receive new data from the main memory, and the output buffer continues to send processed data to the main memory. It should be noted that although the processing unit may operate in a pipeline manner, the rate at which processed data is written to the output buffer is not necessarily equal to the rate at which input data is read from the input buffer. For example, a processing unit performing an image data compression operation will usually generate less data at its output than it receives at its input, and a processing unit performing a decompression operation will usually generate more data at its output than it receives at its input.

The transfer of packets to and from the DMA module is controlled, as described below in further detail, such that input data is made available for each of the processing units in its input buffer and output data is removed from its output buffer, so that each of the processing units can simultaneously, continuously process data until a process is completed. The simultaneous processing of data in each of the processing units is independent of the other processing units. There is no need to synchronize the processing of data in one processing unit with the processing of data in another processing unit, and thus, the processing units operate asynchronously as long as there are no explicit data dependencies.

The control of packets to and from the processing units 21 by the DMA module 26 will now be described. The DMA module 26 includes a slot manager that manages access to the main memory on a time multiplexed basis, whereby each of the processing units are assigned one or more of the available time slots. Each of the time slots is of sufficient time duration to allow the transfer of one packet of data. There are several related variables that must be coordinated to allow each of the processing units sufficient access to the main memory to allow them to operate continuously and asynchronously in a pipeline manner as described above. These variables include the length of the access cycle, the packet size, the minimum required memory access bandwidth of each of the processing units, and the number of time slots assigned to each of the processing units in an access cycle. By optimizing each of these variables, within overall constraints of the system, packet size, total number of time slots per full cycle of the slot manager, and the number of time slots per full cycle of the slot manager which are assigned to each processing unit can be determined. The total number of time slots per slot manager cycle determines the granularity with which bandwidth can be distributed.

It can be understood from the above, that the total memory bandwidth of the main memory 32, available to the DMA channels, preferably, is more than the sum of the minimum required memory bandwidth of each of the processing units 21. The full memory bandwidth of the main memory is not usually available to the DMA channels, as the CPU of the system will typically access the main memory on a shared basis with the DMA channels, so that the memory bandwidth available to the DMA channels is less than the total memory bandwidth of the main memory 32. The required memory bandwidth of the CPU, and any other functions requiring access to the main memory, should be considered in determining the optimum time slot table. The use of assigned time slots for each of the processing units ensures that each of the processing units has a minimum memory access bandwidth.

In a microcontroller system in accordance with embodiments of the present invention that uses a DMA module with a slot manager as described above, there may be modes of operation of the system for which one or more of the processing units does not require its previously defined minimum bandwidth, resulting in bus cycles during which one of the processing units does not require access to the main memory during its assigned time slots. This may result in unused time slots. To enable the system to make most efficient use of the memory bandwidth of the main memory, when the time slot manager detects that a time slot will be unused, the time slot manager reassigns the time slot to another channel. Further, to make most efficient use of the main memory, the assignment of time slots may be changed by the time slot manager based on the operational mode of the system.

Figure 3:
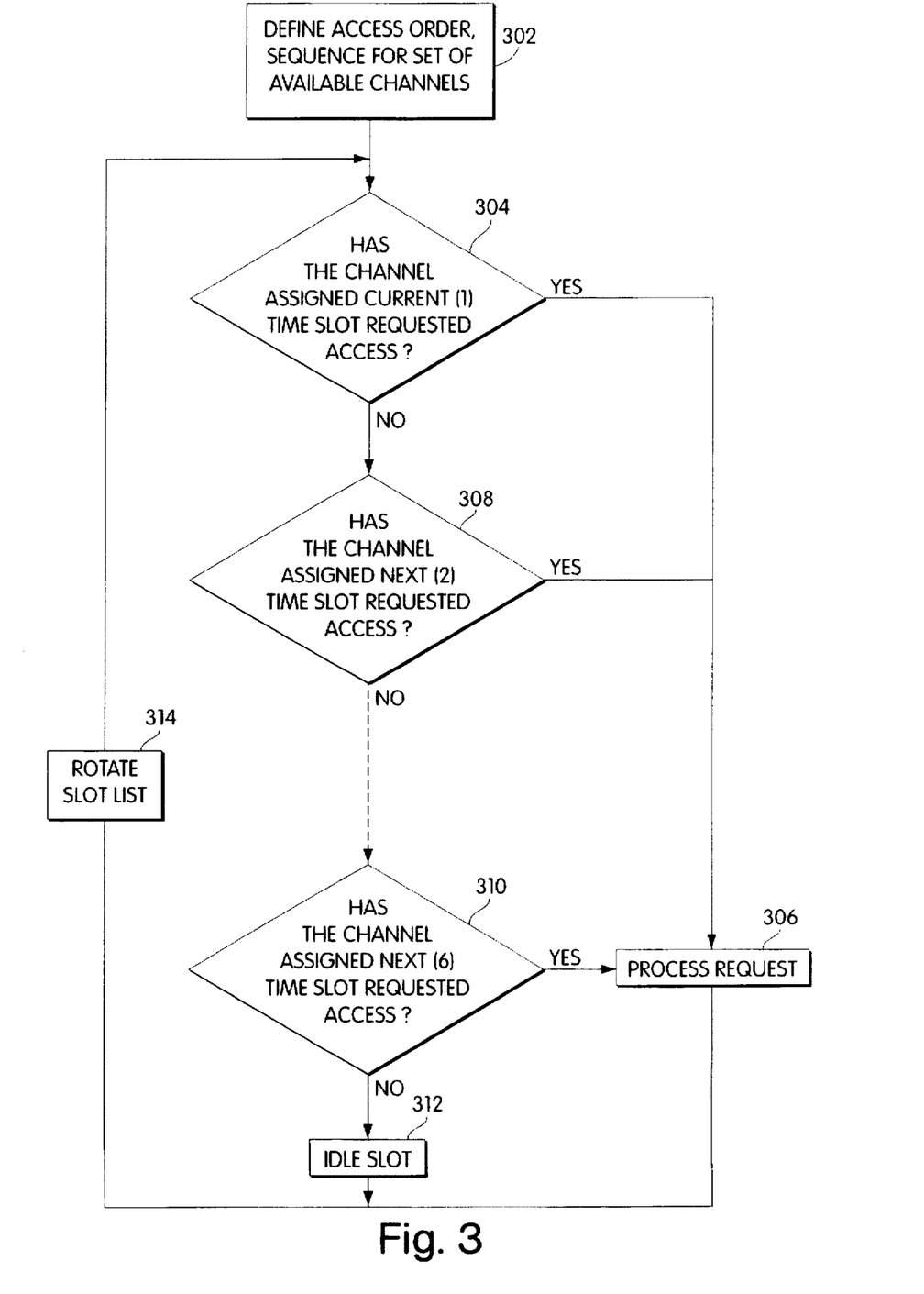
FIG. 3 shows a flow chart describing the method by which time slots are assigned to channels of a DMA system in accordance with one embodiment of the present invention.

The operation of a DMA system in accordance with the embodiment of the invention described above, will now be further described with reference to FIG. 3 which shows the operation of the DMA system in flow chart format. As shown in FIG. 3, the DMA system first establishes an order of access to the memory by each of the DMA channels (step 302). The priority order of access is defined by assigning each of the channels one or more specific time slots of those available in a cycle. The next step is to determine whether the channel assigned the present time slot has requested access to the main memory (step 304). If the outcome of step 304 is "yes", then access is granted and the processing unit attached to the channel writes data to or receives data from the main memory (step 306) and the process returns to step 304. If the outcome of step 304 is "no", then in step 308, the same decision process is repeated for the channel assigned to the next time slot. If the result of step 308 is "yes", then in step 306, access will be granted to the next channel. If the result of step 308 is "no", then the channel assigned to the next time slot will be considered for memory access as in steps 304 and 308, and this process continues (step 310) until the depth of the decision pipeline is exhausted. Ideally the depth of the decision pipeline matches the number of competing resources. For example, in one embodiment having six channels, the depth of the pipeline is ideally six. After a request has been processed (step 306), or after there has been an idle slot (step 312), the slot table is rotated (step 314), and the procedure repeats with step 304.

One specific embodiment of a microcontroller system 100 incorporating the DMA scheme generally described above will now be described. FIG. 4 shows a block diagram of the major components of the microcontroller system 100 along with data flow paths between the components. Control and timing signals are not included within the diagram of FIG. 4 to prevent the diagram from becoming overly complex. Further, as understood by those skilled in the art, the CPU 110, DMA module 120, memory management and control module 130 and the MMPI management and control module 140 may be connected through a system bus (not shown) to accomplish the data flow shown. The microcontroller system 100 shown in FIG. 4 is designed to provide image processing to support multi-functional equipment for workgroup and professional office markets to support document scanning, document printing, facsimile, and digital copying.

The microcontroller system 100 includes a central processing unit (CPU) 110 that in one embodiment includes an IBM PowerPC 401 Processor. The microcontroller system also includes a DMA module 120 having 6 channels for providing processing units 131–138 access to either a remote Memory Mapped Peripheral Interface (MMPI) bus through a MMPI management and control module 140 or to a remote memory through a memory management and control module 130. The remote MMPI bus provides access to memory-mapped resources such as program ROM (read only memory), LCD display, expansion cards, and any other system extensions as may be required.

The memory management and control module provides access to the microcontroller system's main memory which in one embodiment of the present invention is located external to the microcontroller system 100. In one embodiment, the memory management and control module 130 is implemented using a Rambus® controller utilizing memory technology developed by Rambus, Inc. of Mountain View, Calif. Rambus® controllers are available from several companies including NEC, Toshiba and IBM. In one embodiment, the microcontroller system 100 is designed to operate with 64 MB of external Rambus® DRAM (RDRAM) available from one of several sources including Toshiba, and NEC.

The use of the Rambus® technology for the main memory and for the interface to the main memory results in extremely fast memory access time, and thus, a high memory bandwidth, especially with sequential data packets. Further, the Rambus® technology supports a variety of transaction sizes including 32 bytes and 64 bytes, thus, readily accommodating packet sizes of 32 or 64 bytes.

Although embodiments of the present invention are designed to operate with a main memory implemented using Rambus® technology, the present invention is not limited to systems using Rambus® technology, and other memory systems may also be used with embodiments of the present invention. As understood by those skilled in the art, it is desirable to use a high speed memory system to provide sufficient memory bandwidth for the implemented number of DMA channels and associated high speed processing units.

Figure 4:
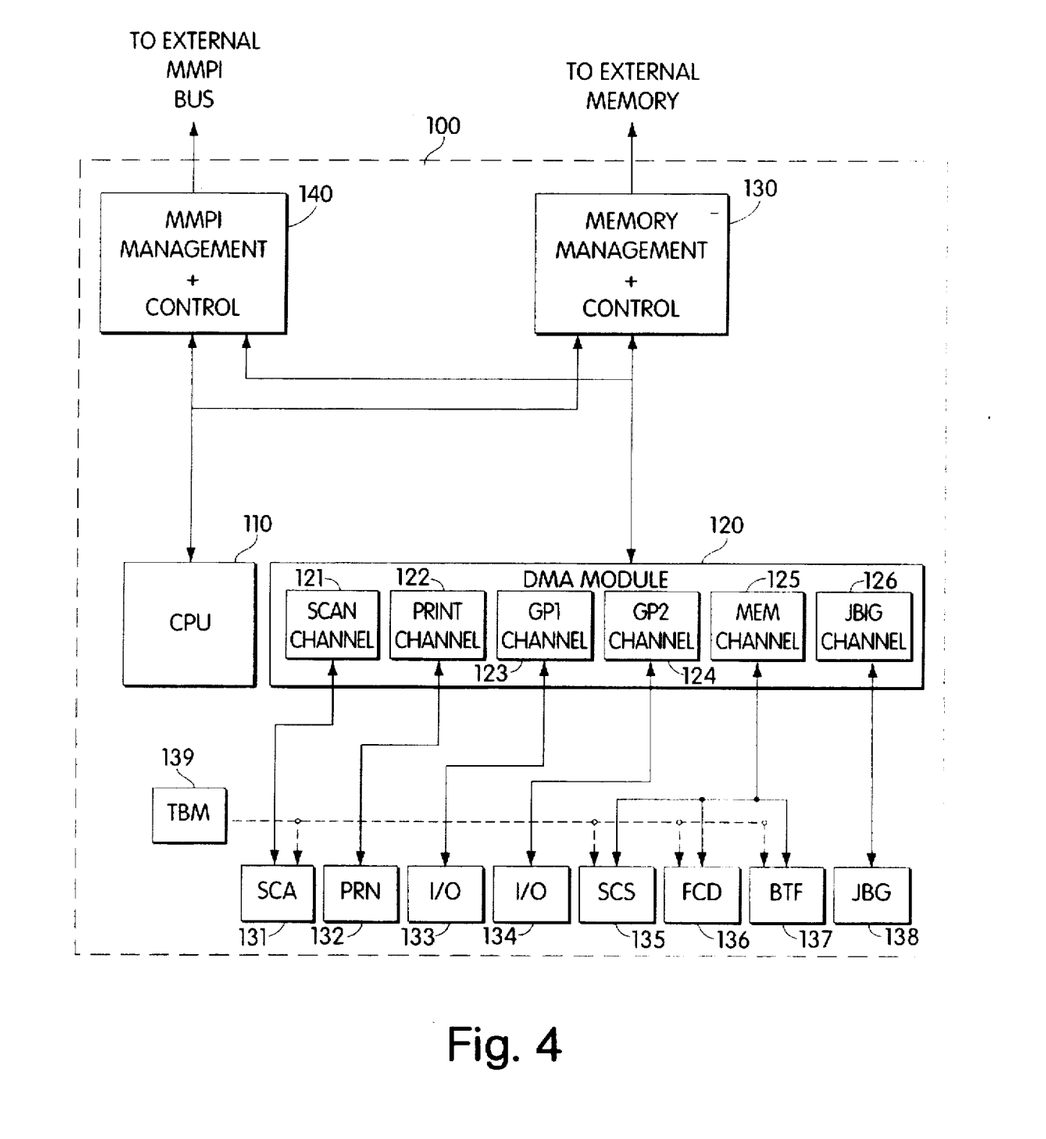
FIG. 4 is a block diagram of a microcontroller system incorporating a DMA memory access scheme in accordance with one embodiment of the present invention.

In the embodiment of the microcontroller system shown in FIG. 4, the DMA module 120 has six channels 121–126 for providing memory access to 8 processing units 131–138. Three of the processing units 135, 136 and 137 share one DMA channel 125. The algorithmic needs of the processing units will determine the number of input and output buffers for a given processing unit, similar to the processing units 21 described above with reference to FIG. 2. For example, a printer interface unit may require only an input buffer to receive print data from the memory, while a scanner interface unit may need only an output buffer to send data to the memory. The function of each of the processing units 131–138 is described below.

A SCA (scan) processing unit 131 is coupled to the scanner channel 121 of the DMA module to receive data from a scanner interface of the system and transfer the data to the main memory of the system. The SCA processing unit can perform a number of manipulations on the data received through the scan channel including 8-bit table lookup and thresholding. In order to accomplish the table lookup, the SCA processing unit obtains transformation data from a table memory 139 (the table memory is described in further detail below).

A PRN (print) processing unit is coupled to the print channel 122 of the processing module to transfer data from the main memory of the microcontroller system 100 to a printer interface. In addition to transferring data, the PRN processing module can perform a number of data processing functions on the data including rotating and scaling operations.

I/O processing units 133 and 134, are respectively coupled to the GP1 (general purpose channel 1) channel 123 and to the GP2 (general purpose 2) channel 124 of the DMA module 120. The I/O processing units are general purpose processing units used to transfer data between devices and memory or from memory to memory without any processing performed on the data. I/O processing unit 132 is used to transfer data between an external host and the main memory through, for example, a IEEE 1284 port (not shown) of the microcontroller system 100. I/O processing unit 134 can be used, for example, to transfer data between an external facsimile unit (not shown) and the main memory.

The SCS (scale and screening) processing unit 135, the FCD (fax compression/decompression) processing unit 136 and the BTF (bitonal filter) processing unit 137 are image processing units used to read image data from the main memory, process the image data, and return the processed image data to main memory. The SCS, FCD and BTF processing units access the main memory through the memory channel 125 of the DMA module on a shared basis, however, only one of the processing units may access the channel at a time. The SCS processing unit 135 performs scale and screening operations on image data, the FCD processing unit 136 performs fax compression and decompression operations on image data, and the BTF processing module 137 performs bitonal filter operations on image data. A method for converting contonal images to bitonal images is disclosed in pending U.S. patent application entitled "System and Method for Providing Lossy Compression", filed Nov. 7, 1996, by Fred E. Andree and Geoffrey A. Dreher, assigned to the assignee of the present invention, and incorporated herein by reference.

The JBIG processing unit 138 is coupled to the JBIG channel of the DMA module to provide JBIG compression and decompression operations on data stored in the main memory.

The processing units of the microcontroller system 100 of FIG. 4 access the main memory and access the MMPI bus through the DMA module in the same manner as the processing units 21 of FIG. 2 described above. The DMA module has a slot manager that controls access to the MMPI bus and to the main memory using assigned time slots to transfer data in fixed packet sizes. For the system shown in FIG. 4, the packet size is set to 32 bytes (256 bits). As described above, the use of 32 byte packets is compatible and efficient with the main memory implemented using Rambus® technology in one embodiment of the present invention.

Figure 5:
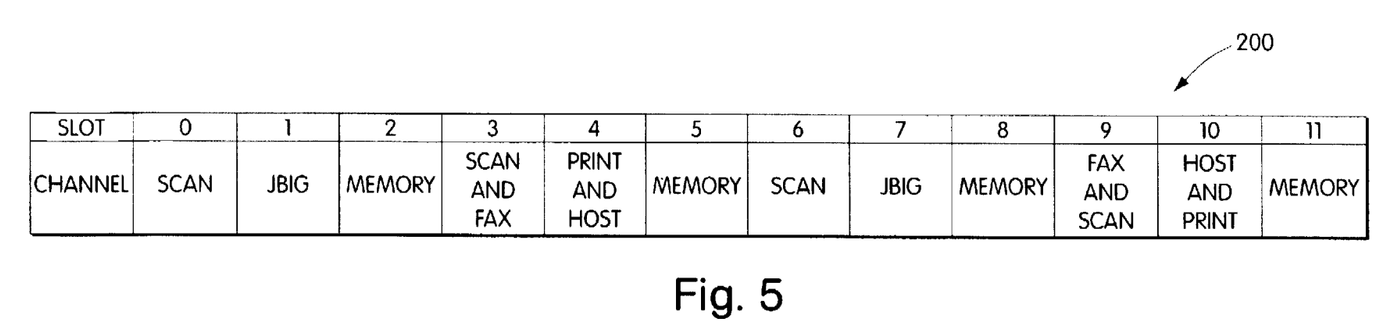
FIG. 5 is a slot assignment table for the embodiment of the invention shown in FIG. 4.

FIG. 5 shows a DMA time slot assignment table 200 showing the time slot assignments for one access cycle of the six channel DMA module 120 shown in FIG. 4. There are 12 time slots numbered from 0 to 11 in one access cycle. During each time slot, one packet of data having 32 bytes is usually transferred, however, less than 32 bytes may be transferred when, for example, the number of remaining bytes of an image to be transferred is less than 32.

The most critical functions of the microcontroller system 100 requiring the most frequent access to the main memory are the scan, print and JBIG functions. The SCA processing unit 131 and the PRN processing unit 132, which respectively perform the scan and print functions, are coupled to real time engines, and thus, it is critical that their minimum memory bandwidth requirements be met. Each of time slots 3, 4, 9 and 10 are assigned to two processing units. For each of time slots 3, 4, 9 and 10, one of the two processing units is given priority, and will have its request for access granted if both channels are requesting access. For time slot 3, the scan channel is given priority, for time slot 4, the print channel is given priority, for time slot 9 the fax is given priority, and for time slot 10, the host is given priority.

The slot assignment scheme shown in FIG. 5 applies when all of the channels are busy and are requesting access during their assigned time slots. If the channel assigned to the current time slot is not busy, then the channel assigned the next time slot, according to the sequence defined by table 200, that has a pending request can use the available time slot.

An image to be transferred, for example, from the main memory through the Mem channel 125 to be compressed by the FCD processing unit 136 will be transferred in 32 byte packets until the entire image to be processed has been transferred. Each of the 32 byte packets will be transferred in either time slots 2, 5, 8 or 11 which are the time slots assigned for the Mem channel. The 32 byte packets may also be transferred in one of the other time slots if any of the other processing units are not busy and hence not requesting access to the main memory. If when time slot 7 is the first choice, the JBIG channel does not have a request for access to memory pending, then the FCD processing unit can access the memory through the Mem channel associated with it, which owns the next time slot to follow.

As discussed above, the table memory 139 is used to store transformation tables used by the SCA processing unit 131 to transform images. As shown in FIG. 4, the table memory 139 is also coupled to the SCS processing unit 135, the FCD processing unit 136 and the BTF processing unit 137 to provide these processing units with processing data such as transformation or compression variables used to process image data. The processing data read from the table memory is read in relatively small data increments (typically only several bits are accessed at a time). While it would be possible to store the processing data in the main memory and access the processing data through the DMA module, it would be inefficient to do so, since only several bits of data are accessed at a time, and the overhead of initiating a system memory access for such a small amount of data is prohibitive. The table memory may be included within the DMA module or located external to the DMA module.

Figure 6:
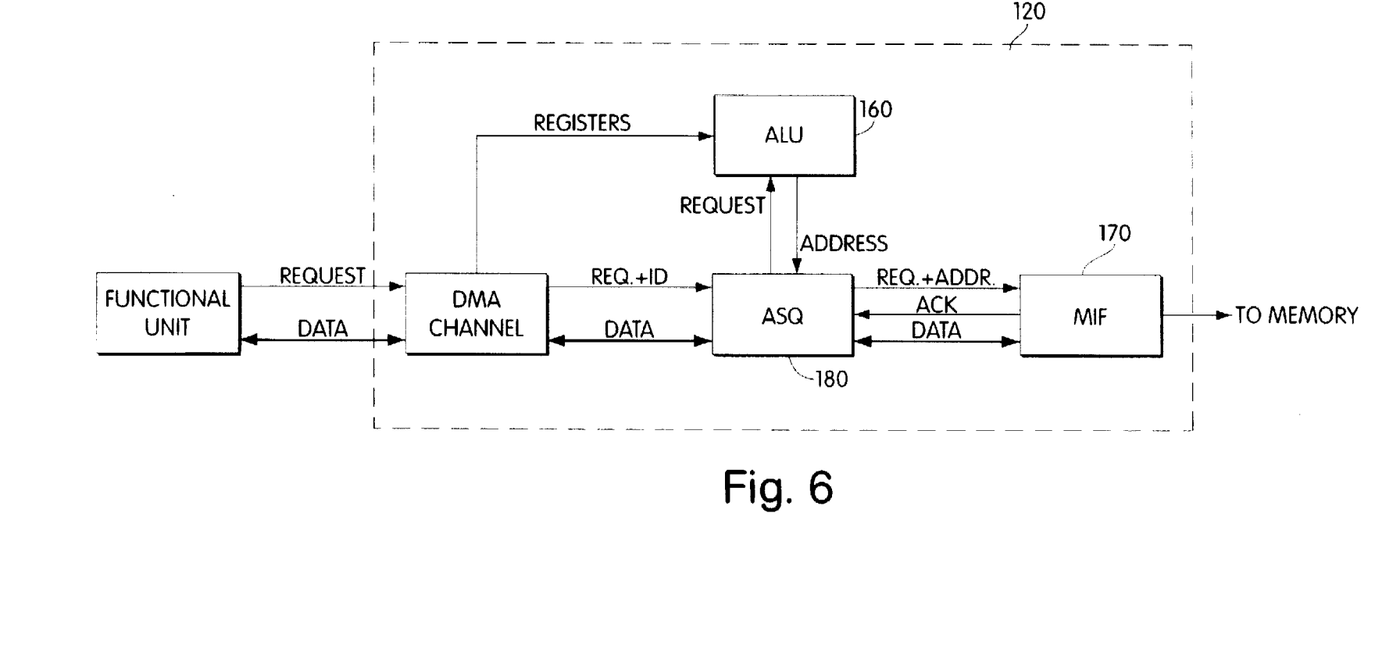
FIG. 6 is a block diagram of a DMA module of the embodiment of the present invention shown in FIG. 4.

The operation of the DMA module in one embodiment of the present invention will now be described with reference to FIG. 6 which shows a block diagram of the functional modules included within the DMA module to provide connection between the processing units and the main memory. These functional modules include an ALU module 160, an ASQ module 180 an MIF module 170, and a DMA channel module. The block diagram of FIG. 6 shows only one DMA channel to simplify the block diagram. The DMA channel shown is one of the DMA channels 121–126 shown in FIG. 4.

The ASQ module 180 of the DMA module is an address sequencer that receives requests for access from the DMA channel. The ASQ module generates a processing unit-unique number. With this number it selects a channel specific register set to be used for address computation by the ALU. The channel registers hold pointers used for address computation. The ASQ module then requests and subsequently receives an address from the ALU module 160, and provides the address and request to the MIF module 170.

The ALU module 160 is implemented using an arithmetic logic unit that receives the request for an address from the ASQ module and generates a next address.

The MIF module is a memory interface module which receives a request, an address, and a request tag from the ASQ module 180, and returns an address acknowledge to the ASQ and the request tag to the requesting channel. When the MIF is ready to serve the received request, it will present the tag for that request to all processing units. The processing unit with the matching tag will pick up the data transaction.

In one embodiment, the MIF is able to pipeline up to four requests. Each of the requests is identified by the tag generated by the ASQ. The tag is sent with the acknowledge from the MIF to the ASQ. The tag and the acknowledge is then sent by the ASQ to the channel and by the channel to the processing unit that requested access to the memory. When the MIF is ready, the data will be sent, and the unit having the valid tag will receive the data. The use of tags prevents out of order data packets from being routed to the wrong functional unit. An out of order data packet is most likely to occur for a read from the Rambus memory while another read is still pending from the MMPI bus, because access to the MMPI is generally slower than access to the Rambus memory.

In one embodiment of the invention, when a channel simultaneously requests read access and write access, the write access request is always processed first, and the read access will be processed in a later time slot. In one embodiment of the present invention, the slot table is implemented in logic, and the assignment of slots in the slot table is fixed for a given system. In another embodiment, the slot table is programmable and the assignment of slots to channels can be changed based on any of a number of parameters including based on an operational mode of the system.

In a preferred embodiment of a microcontroller system in accordance with the present invention, the microcontroller system is incorporated within an ASIC (application specific integrated circuit) with the MMPI bus and the main memory external to the ASIC. Incorporating the microcontroller system in an ASIC allows for integration of standard and custom logic and facilitates high speed block data transfers by keeping interconnecting leads to a minimum. In embodiments of the present invention, the functional modules described above may be implemented as software modules, hardware circuits or by using a combination of hardware circuits and software modules.

Embodiments of the present invention are particularly useful in systems that have multiple, simultaneous processing activities. Using embodiments of the present invention, input data can be transferred in packets from a main memory to a processing unit. Once one packet has been received in the input buffer, the processing unit can begin processing the data and outputting processed data to the output buffer and subsequently to the main memory, while input data continues to be received in the input buffer. Further, other processing units can simultaneously and independently receive and process other data, thereby making most efficient use of system resources. This time multiplexed scheme assumes that the time required for a packet transfer by the memory subsystem is significantly shorter than the time spent by a processing unit to actually process the data packet.

The embodiments of the present invention described above overcome the limitations of prior art DMA access schemes described with respect to FIG. 1. Specifically, in the prior art systems, the processing units have local memories that provide temporary storage for data to be processed by the processing units. The local memories tend to be quite large and therefore expensive, particularly in systems used for processing image data, wherein an entire image or large segments of an image are stored in the local memory. Embodiments of the present invention do not require large local memories, but rather, utilize high speed packet transfer to provide the processing units with input and output data windows moving dynamically over the input and output data spaces in system memory.

As discussed above, size limitations of the local memory can limit the functionality or performance of prior art systems. A prior art system designed to operate with an image having 300 dpi resolution, may not be able to operate with an image having 600 dpi resolution. Embodiments of the present invention overcome this drawback, since the processing units do not use local memories that can limit performance.

In prior art systems as described above, it can be difficult to determine the minimum memory bandwidth available to each processing unit. Embodiments of the present invention overcome this drawback by providing a minimum memory bandwidth for each of the processing units that can be set based on requirements of the processing unit.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is way of example only. It is not intended as limiting. The invention's limit is defined only in the following claims in the equivalents thereto.

What is claimed is:

1. A microcontroller system for accessing a memory to receive data from the memory and to provide data to the memory, the microcontroller system comprising:

a plurality of processing units; and an interface access module that interfaces with the memory and the plurality of processing units to control access by the processing units to the memory, the interface access module including a controller constructed and arranged to control access to the memory by the plurality of processing units on a time-shared basis such that each of a plurality of time slots in a predefined cycle of time slots is assigned to one of the plurality of processing units, and such that if a first processing unit of the plurality of processing units does not request access to the memory during a time slot assigned to the first processing unit, then a second processing unit of the plurality of processing units is allowed to access the memory during the time slot assigned to the first processing unit.

2. The microcontroller system of claim 1, wherein the controller includes a plurality of channels to couple the plurality of processing units to the memory, each of the plurality of processing units being couplable to at least one of the channels.

3. The microcontroller system of claim 2, wherein data transfers between the memory and the plurality of processing units occurs using packets of data, each packet of data having a predetermined maximum amount of data.

4. The microcontroller system of claim 3, wherein the interface control module includes a time slot table that defines the number of slots available in a cycle and the time slot assignments for each of the plurality of processing units.

5. The microcontroller system of claim 4, wherein the time slot table is adapted such that the microcontroller system can change the time slot assignments based on an operational mode of the microcontroller system.

6. The microcontroller system of claim 5, further comprising a central processing unit and a data bus, the central processing unit being coupled to the interface control module through the data bus.

7. The microcontroller system of claim 6, wherein the interface control module is adapted to interface to a device other than the memory, such that data can be transferred between either the memory and one of the plurality of processing units or between the device and one of the plurality of processing units.

8. The microcontroller system of claim 2, wherein the interface control module includes a time slot table that stores the time slot assignments for each of the plurality of processing units.

9. The microcontroller system of claim 1, further comprising a central processing unit and a data bus, the central processing unit being coupled to the interface control module through the data bus.

10. The microcontroller system of claim 1, wherein the interface control module is adapted to interface to a device other than the memory, such that data can be transferred between either the memory and one of the plurality of processing units or between the device and one of the plurality of processing units.

11. A method for providing access to a memory by a plurality of processing units, the method including steps of:

establishing an order of access to the memory by the plurality of processing units by assigning each of the plurality of processing units a time slot in a memory access cycle to enable the plurality of processing units to access the memory on a time-shared basis;

detecting a request for access to the memory by one of the plurality of processing units; and allowing the one of the plurality of processing units to access the memory to transfer data during its assigned time slot;

detecting that a first one of the plurality of processing units has not requested access during its assigned time slot; and allowing a second one of the plurality of processing units to access the memory to transfer data during the time slot assigned to the first one of the plurality of processing units.

12. The method of claim 11, wherein the step of allowing the second one of the plurality of processing units to access the memory includes steps of:

determining whether any of the plurality of processing units other than the first one has requested access to the memory; and selecting one of the processing units that has requested access as the second one of the processing units based on a predetermined priority assigned to each of the processing units.

13. The method of claim 12, further comprising a step of setting the predetermined priority on the basis of the established order of access.

14. A microcontroller system for accessing a memory to receive data from the memory and to provide data to the memory, the microcontroller system comprising:

a plurality of processing units;

a plurality of data channels coupled to the plurality of processing units; and means for controlling data transfers between the memory and the plurality of processing units and for controlling access by the processing units to the memory on a time-shared basis, wherein the means for controlling includes:

means for assigning each of the plurality of data channels at least one time slot in a memory access cycle so that data can be transferred between the memory and one of the processing units through a data channel during an assigned time slot for the data channel; and means for allowing a processing unit coupled to a second channel of the plurality of data channels to access the memory during a first time slot assigned to a first channel of the plurality of data channels if a processing unit coupled to the first channel has not requested access to the memory during the first time slot.

15. The microcontroller system of claim 14, wherein data transfers between the memory and one of the plurality of processing units occurs using packets of data, each packet of data having a predetermined maximum amount of data.

16. The microcontroller system of claim 15, further comprising means for storing the time slot assignments for each of the plurality of data channels.

17. The microcontroller system of claim 16, further comprising means for changing the time slot assignments based on an operational mode of the microcontroller system.

18. The microcontroller system of claim 17, further comprising a central processing unit and a data bus, the central processing unit being coupled to the means for controlling through the data bus.

19. The microcontroller system of claim 18, further comprising means for controlling access to a device other than the memory, such that data can be transferred between either the memory and one of the plurality of processing units or between the device and one of the plurality of processing units.

20. The microcontroller system of claim 14, further comprising a central processing unit and a data bus, the microcontroller being coupled to the means for controlling through the data bus.

21. The microcontroller system of claim 14, further comprising means for controlling access to a device other than the memory such that data can be transferred between either the memory and one of the plurality of processing units or between the device and one of the plurality of processing units.

22. The microcontroller system of claim 14, wherein a plurality of processing units is coupled to at least one of the plurality of channels.

23. A microcontroller system for accessing a memory to receive data from the memory and to provide data to the memory, the microcontroller system comprising:

a plurality of processing units;

a plurality of data channels coupled to the plurality of processing units; and an interface access module that interfaces with the memory and interfaces with the plurality of processing units through the data channels to control access by the processing units to the memory;

wherein the interface access module includes a controller constructed and arranged to control data transfers between the memory and the plurality of processing units such that each of a plurality of time slots in a predefined cycle of time slots is assigned to one of the plurality of channels, and such that if a processing unit coupled to a first channel of the plurality of channels does not request access to the memory during a time slot assigned to the first channel, then a processing unit coupled to a second channel is allowed to access the memory during the time slot assigned to the first channel.

* * * * *